Sept. 16, 1952 H. N. BLISS 2,610,794
COUNTER RESETTING MECHANISM
Original Filed Nov. 27, 1946 2 SHEETS—SHEET 1
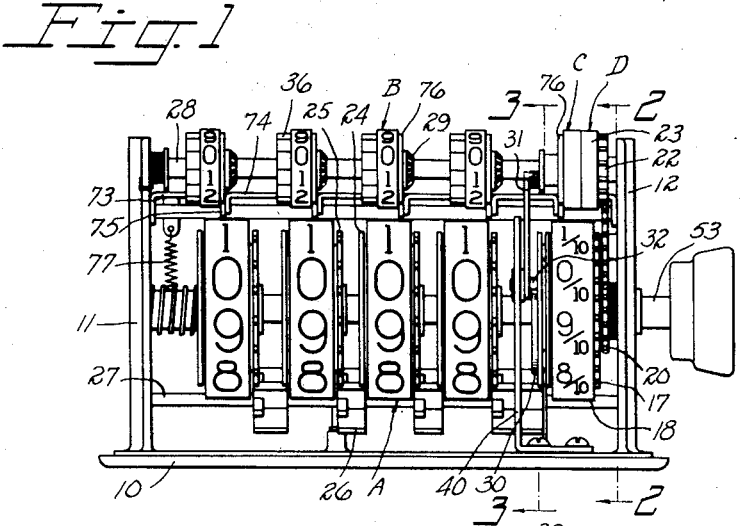
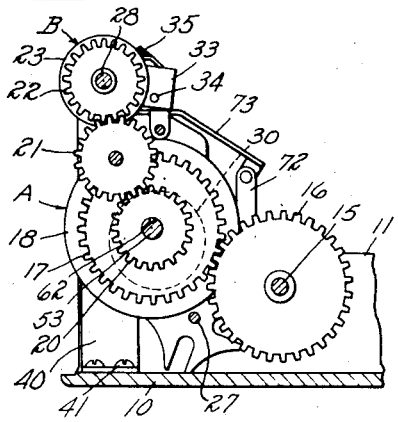
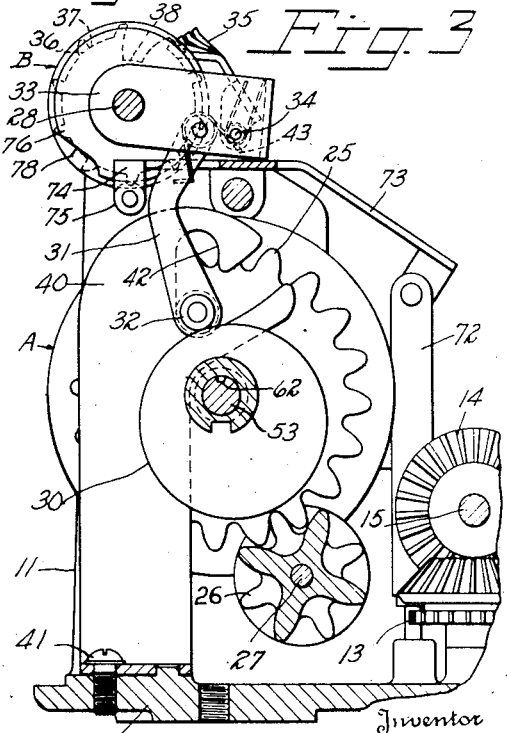
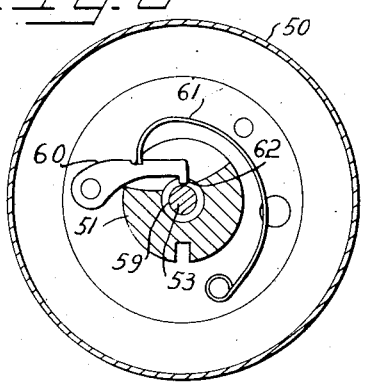
Inventor
HARVEY N. BLISS
By Lindsey, Prutzman + Just
Attorneys Sept. 16, 1952  H. N. BLISS  2,610,794
COUNTER RESETTING MECHANISM
Original Filed Nov. 27, 1946  2 SHEETS—SHEET 2
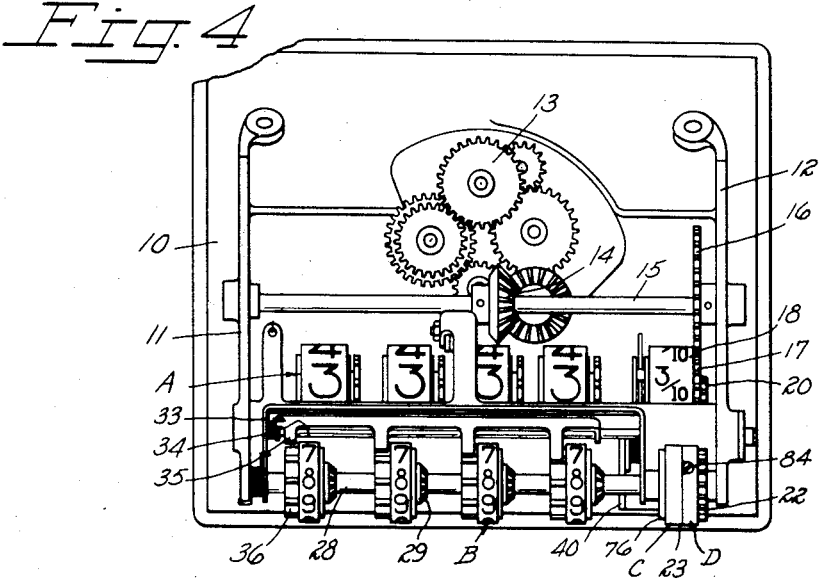
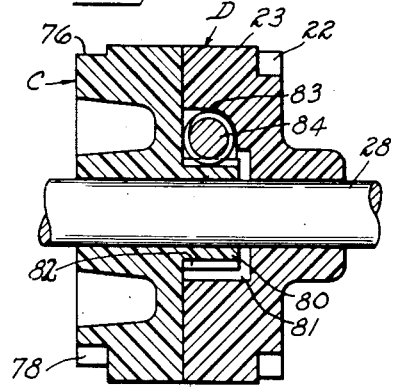
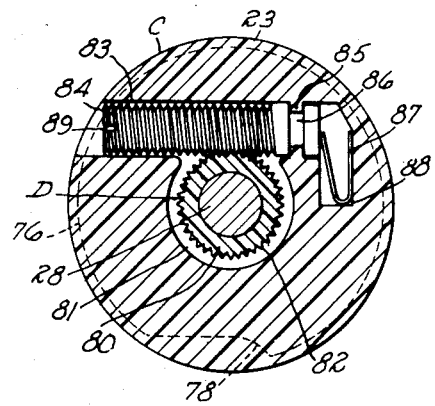
Inventor
HARVEY N. BLISS
By Lindsey, Prutzman + Just
Attorneys Patented Sept. 16, 1952

2,610,794

UNITED STATES PATENT OFFICE 2,610,794

COUNTER RESETTING MECHANISM

Harvey N. Bliss, Windsor, Conn., assignor to Veeder-Root Incorporated, Hartford, Conn., a corporation of Connecticut Original application November 27, 1946, Serial No. 712,575, now Patent No. 2,524,755, dated October 10, 1950. Divided and this application December 27, 1948, Serial No. 67,473

8 Claims. (Cl 235—144)

The present application is a division of my copending application Serial No. 712,575, filed November 27, 1946, now Patent No. 2,524,755, issued October 10, 1950.

The present invention relates generally to registering or counting apparatus, and more particularly to a number wheel for use in such apparatus. The number wheel of the present invention is characterized in that there is provided a friction drive between the indicia bearing portion or cup of the wheel and the positively driven components of the wheel.

The utility and advantage of such a frictionally driven wheel resides, in part, in the preferred manner in which it may be reset to zero. That is to say, the wheel (or at least the indicia bearing portion thereof) may be mounted for resetting to zero in a direction of rotation opposite to that from which it is driven during operation of the registering or counting apparatus. As will be readily apparent, this manner of resetting applies a force to the driving gear train in the same direction as applied during counting or registering thus eliminating any backlash effect and a resulting inaccuracy in the count. A further advantage of a backward reset is that the operator cannot fraudulently advance or increase the count by use of the resetting mechanism. Another advantage of a frictional drive is that it will avoid breakage such as when the operator intentionally or otherwise attempts to reset the counter or register during a counting or registering operation.

An object of the present invention is to provide a frictionally driven register wheel for the purpose described in which the frictional force applied may be reduced but not entirely eliminated during resetting to facilitate the resetting operation. This arrangement permits a strong non-slipping connection during registering or counting which may be reduced to make resetting easy and to eliminate strain during resetting, but at the same time a free rotating condition of the wheel is avoided so that the wheel will not rotate except as intended by the resetting mechanism.

A further object of the invention is to provide such a shiftable frictionally driven number wheel which is effective and foolproof in operation, which is of simple and rugged construction such that it will provide satisfactory service over long periods of use, which is compact in arrangement so as to be generally similar in appearance and size to a conventional register wheel, which is economical to fabricate and assemble, and which may be manufactured at relatively low cost.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Figure 1 is a front view of a predeterminator register incorporating the frictionally driven wheel construction of the present invention;

Fig. 2 is a cross sectional view taken along the line 2—2 of Fig. 1;

Fig. 3 is a cross sectional view taken along the line 3—3 of Fig. 1;

Fig. 4 is a top view of the register;

Fig. 5 is a transverse cross sectional view of a non-indicating wheel utilized as the counterwheel unit of lowest order of the predetermining counter;

Fig. 6 is a cross sectional view of the same wheel taken at a right angle to that of Fig. 5;

Fig. 7 is a cross sectional view of the counterwheel unit of lowest order of the registering counter, which wheel is a frictionally driven wheel constructed in accordance with and embodying the present invention; and Fig. 8 is a cross sectional view taken along the line 8—8 of Fig. 7.

In order to demonstrate the use of the present invention and by way of background, the indicator wheel of the present invention will be described in connection with the predeterminator register shown and claimed in the parent application referred to above. However, this is done merely by way of illustration and it is to be understood that the invention is not limited to this particular application of the wheel.

Referring to the drawings, and particularly Figs. 1 and 4, there is shown a predeterminator register mounted on a frame comprising a base plate 10 and side plates 11 and 12. The register is adapted to be driven, for example, by a meter (not shown in the drawings) which is operatively connected to the register through the gear train 13 positioned in the rear of the device. The gear train culminates in a bevel gear 14 fixed on a shaft 15 rotatably mounted on the side plates 11 and 12.

As best shown in Fig. 2, the shaft 15 has a spur gear 16 fixed at one end thereto which is in mesh with a driven gear 17 fixed to the first counterwheel unit 18 of the registering counter A, which unit 18 is constructed in accordance with and embodies the present invention and is shown in detail in Figs. 7 and 8.

The first counterwheel unit 18 also has fixed thereto a second gear 20 which, through idler gear 21, drives a gear 22 fixed to the first wheel unit 23 of the predetermining counter B. The first wheel unit 23 is an adjustable wheel and its function is to provide adjustable means for initiating or operating the shut-off of an associated apparatus such as a fluid valve or pump (not shown). In the embodiment shown, the wheel unit 23 is not provided with indicia and is not arranged to be viewed. However, this is a mere matter of choice.

The counterwheel units (shown five) of the registering counter A hereinafter referred to as the "registering counterwheel units" are arranged in progressive order, the first unit 18 being adapted to register tenths, the second to register units, etc. The first registering counterwheel unit has indicia comprising "0/10" to "9/10," while indicia comprising the figures "0" to "9" are provided in the usual manner on the peripheries of the remaining wheel units to register with windows in the casing (not shown) whereby the setting of the wheels may be observed and read. Except for the first unit 18, each of these counterwheel units is of a conventional type and will not be described in detail here. Each is provided with the usual driving gears 24 and driven gears 25 adapted to cooperate with the transfer pinions 26 mounted on a transfer pinion shaft 27 extending between the side plates 11 and 12. Any suitable transfer mechanism may be utilized and the particular construction selected forms no part of the present invention.

The upper set of counterwheel units comprising the predetermining counter B hereinafter referred to as the "predetermining counterwheel units" comprises an equal number of wheel units, including the non-indicating wheel unit 23 previously referred to. All of the predetermining counterwheel units with the exception of the first unit 23 are provided in the usual manner with indicia ranging from "0" to "9." All of these predetermining counterwheel units are rotatably mounted on a shaft 28 extending between the side plates 11 and 12. In the completely assembled device, means (not shown in the drawings) is provided for presetting each of the wheel units separately for any desired reading, except for the non-indicating unit 23 which is continuously geared to the first registering counterwheel unit 18 and whose setting, therefore, is fixed thereby. Such presetting means is well known in the art, being usually comprised of individual presetting shafts and knobs adapted to cooperate with the bevel gears 29 respectively fixed to each of the predetermining counterwheel units. Any suitable presetting arrangement may be utilized and the particular mechanism selected forms no part of the present invention.

Each of the predetermining counterwheel units, with the exception of the non-indicating wheel unit 23 which is directly geared to the first registering counterwheel unit 18, as described above, is driven by a cam and ratchet arrangement more particularly shown in Fig. 3 of the drawings. As best shown in Fig. 3, a camming disk 30 secured to the registering counterwheel unit 18 and rotatable therewith causes a lever arm 31 to be reciprocated up and down for each turn of the counterwheel unit. The camming disk 30 is so arranged that the lever arm 31 is driven upwardly during the first half of a turn of the wheel unit 18 and permitted to return during the last half of the turn. The lower end of the arm 31 has a roller 32 adapted to rest on the periphery of the cam disk 30 to reduce the friction between the arm and the disk. The upper end of the arm 31 is pivotally connected to a frame member 33 which, in turn, is pivotally mounted on the shaft 28 supporting the predetermining counterwheel units of the predetermining counter B. Accordingly, the frame also is reciprocated up and down by the turning of the counterwheel unit 18.

Pivotally supported on a shaft 34 extending through the pivotal frame member 33 are a plurality of ratchet arms 35 which are adapted, respectively, to engage ratchet wheels 36, one of which is fixed to each of the predetermining counterwheel units. Each of the ratchet wheels 36 is provided with notches 37 corresponding to the indicia on the number wheel, which notches are all of equal size, and a relatively deep notch 38 positioned for engagement with the ratchet arms 35 when that particular counterwheel unit registers zero. The ratchet arms 35 are disposed at relative angles decreasing in amount in sequence such that when one of the ratchet arms 35 is in engagement with a notch 37 of a counterwheel unit of lower order, the remaining ratchet arms 35 cannot engage the notches of the ratchet wheel or wheels of the counterwheel units of higher order. However, when the counterwheel unit of lower order has been regressed to "zero," the notch 38 of that wheel, which then receives the corresponding arm 35, is sufficiently deep to permit the arm 35 for actuating the next counterwheel unit to be displaced into engagement with a notch of the said next counterwheel unit, thus functioning as a transfer device. The notches 38 being formed of sufficient depth so that all ratchet wheels are engaged by the ratchet arms 35 when the notches 38 are aligned, it will be apparent that during the reciprocation of the frame member 33 the turning of the predetermining counterwheel units to zero will be accomplished in a stepwise fashion, i. e., the wheel units are returned and come to rest at zero in sequence beginning with the wheel unit of highest order. As mentioned above, the driving of the predetermining counterwheel units is accomplished during the first half of each turn of the first registering counterwheel unit 18 and remain stationary during the last half of the turn. In other words, a full count is registered by said wheels during substantially one half count of the counterwheel unit 18 and of the adjustable wheel 23.

The lower end of the lever arm 31 which rests upon the cam disk 30 of the first registering counterwheel unit 18 is positioned by an upright positioning member 40 secured to the base plate 10 of the frame by suitable screws 41. The supporting member 40 has at its upper end a generally L-shaped slot 42 for receiving the flanged roller 32 on the end of the arm 31. The supporting member 40 and the flanged roller 32 are so arranged that the flanges on the roller 32 by engagement with the sides of the slot 42 prevent any sidewise pivoting of the arm 31 thus insuring that the roller 32 will remain in alignment with the cam disk 30. The vertical portion of the L-shaped slot 42 permits the end of the arm 31 to be reciprocated vertically to cause the driving of the predetermining counterwheel units as previously described. As the direction of rotation of the cam disk 30 during registration is counterclockwise, looking at Fig. 3, there will always be a positive engagement between the cam disk 30 and the lever arm 31 during driving because the tendency of the lower end of the arm 31 to move or pivot toward the front of the register (due to friction between the arm 31 and cam disk 30) is effectively controlled by the forward edge of the L-shaped slot 42. This tendency of the lever arm 31 to move or pivot forwardly of the register is increased, moreover, by a spring 43 situated between the arm 31 and the frame member 33. When the cam disk 30 is turned in a reverse or clockwise direction, which occurs when the registering counterwheel units are being reset to zero, the lower end of the lever arm, which will now tend to move or pivot inwardly of the register, rides outwardly in the L-shaped slot 42 and, therefore, will not be reciprocated up and down. In this way, no motion is transmitted to the frame member 33 during resetting of the registering counterwheel units and, consequently, there is no resultant turning of these units and no effect upon the reading shown thereon.

As referred to above, the first registering counterwheel unit 18 is rotated by a driven gear 17 fixed thereto and it, in turn, drives the first predetermining counterwheel unit 23 (the non-indicating wheel) by a smaller or second gear 20 fixed thereto. The construction of the first registering counterwheel unit 18, which is constructed in accordance with the present invention, is best shown in Figs. 7 and 8. Referring to Fig. 7, it will be observed that the counterwheel unit 18 comprises a number wheel 50 having a hub 51 with a relatively small central opening 52 at one end to accommodate the main portion of the resetting shaft 53 on which the registering counterwheel units are rotatably mounted, and an enlarged opening 54 at the other end to slidably accommodate a boss 55 on the resetting shaft 53. Fixed to the hub 51 of the number wheel is the cam disk 30 referred to above, a locking disk 56, and a third disk 57, said disk 57 and locking disk 56 being spaced apart by spacing pins 58 therebetween. A transfer pin (not shown) may be provided on the disk 57 to engage the first transfer pinion 26 to cause it to turn and thus advance the second registering wheel unit one number for each turn of the unit wheel 18. The resetting shaft 53 contains an annular groove 59 for receiving a pawl 60 pivotally mounted in the hub 51 of the number wheel 50 and urged toward the shaft by a spring member 61 as best shown in Fig. 8. When the resetting shaft 53 is pushed inwardly from right to left as viewed in Fig. 7, the pawl 60 rides laterally out of the annular groove 59 and is held on the outer periphery of the shaft 53 unless or until such time as the shaft is rotated to align the longitudinal resetting groove 62 therewith, whereupon the pawl 60 pivots into engagement with the groove 62 and the number wheel 50 becomes, in effect, keyed to the resetting shaft 53 and may be reset thereby to zero.

The driven gear 17 is rotatably positioned on the hub 51 at the end having the enlarged opening 54 and a connection is made between this gear and the number wheel 50 by means of a pressure plate 63 which is slidably keyed to the hub 51 so that it rotates therewith but is longitudinally slidably thereon. The plate 63 is urged laterally into contact with the driven gear 17 by a relatively strong spiral spring 64 extending between the plate 63 and a shoulder 65 on the hub 51 of the number wheel 50. When the resetting shaft 53 is pushed inwardly from right to left as viewed in Fig. 7, as when it is intended to reset the number wheel units, the boss 55 on the shaft 53 engages the pressure plate 63 and moves it laterally inwardly against the pressure of the spiral spring 64, thereby disengaging the number wheel 50 from the driven gear 17 so that the number wheel is free to be reset to zero by turning the reset shaft 53.

Although the resetting shaft 53 is not intended to rotate the number wheel 50 until the pawl 60 is engaged in the longitudinal resetting groove 62, it has been found that there frequently is sufficient friction between hub 51 and/or the pawl 60 and the periphery of the resetting shaft 53 to cause the number wheel 50 to be rotated before the pawl 60 becomes aligned and engaged with the resetting groove 62. This tendency of the number wheel to rotate prematurely has been avoided in accordance with the invention by providing a second pressure plate 66 slidably keyed to the hub 51 so that it is rotatable therewith but slidable longitudinally thereon, which plate is adapted to frictionally engage the driven gear 17 on the face opposite to that engaged by the first pressure plate 63. In the specific embodiment shown, the pressure plate 66 is between the driven gear 17 and the smaller driving gear 20 which is also slidable longitudinally on the hub 51 of the numbering wheel, this pair of elements (plate 66 and gear 20) being urged toward the driven gear 17 by a coil spring 67 supported on a flanged collar 68 retained on the hub 51 of the wheel by the retaining ring 69 received in an annular groove 70 in the hub. The frictional engagement of the pressure plates 63 and 66 and the driven gear 17 is facilitated by a pair of friction disks 71 therebetween. The pressure exerted by the spring 67 is relatively weak being just sufficient to overcome the friction referred to above without materially interfering with the resetting operation.

The predeterminator shown in the drawings is adapted to shut off or actuate a shut-off mechanism for an associated apparatus (not shown) through a reciprocal connecting arm 72. The arm 72 is pivotally connected to a pivoted lever arm 73 which is attached at one end to a roller bar 74 comprising a series of rollers 75 adapted to respectively engage cam disks 76 on the predetermining counterwheel units of the predetermining counter B. The pivoted lever arm 73 is biased by a spring 77 so as to force the rollers 75 upwardly against the peripheries of the cam disks 76. Each of these cam disks 76 is provided with a notch 78 for receiving the rollers 75 when the counterwheel units are returned to zero during a dispensing operation. As will be apparent, when all of the notches 78 are in alignment with the rollers 75, the lever arm 73 is permitted to pivot under the influence of the biasing spring 77 thereby lowering the connecting arm 72 which is utilized to shut off the associated apparatus by any suitable connection thereto (not shown). Inasmuch as there is usually a brief time interval (due to inertia, for example) between the instant the notches become aligned and the associated apparatus becomes fully stopped, it has been found necessary to provide a notch 78 in the first predetermining counterwheel unit, i. e., the non-indicating wheel unit 23, which is somewhat in advance of the zero position, whereby the shutting off of the associated apparatus is initiated slightly before the desired quantity has been dispensed and whereby the actual shutting off of the associated apparatus is completed by the time the wheel unit 23 reaches zero position. As the amount of coasting after the shutting off of the associated apparatus has been initiated, but before it is completed, will vary widely in different installations, depending on the type of associated apparatus, the shutting off means utilized, etc., it has been found impossible to select a fixed position of the notch 78 of the wheel unit 23 which in all installations will effectively cause the associated apparatus to become completely shut off at the exact instant when the desired predetermined number of units has been dispensed or counted.

Accordingly, the counterwheel unit 23 has been constructed so that the position of the notch 78 is variable with respect to the position of the driven elements of the wheel whereby the same may be adjusted to fit any particular installation. The construction of the counterwheel unit is shown more particularly in Figs. 5 and 6. Referring to these figures, it will be seen that the counterwheel unit 23 is formed in two separate sections C and D. Section C thereof, which includes the cam surface 76 and a notch 78 therein for causing actuation of the roller bar, as previously described, is provided with a hub 80 which extends into a recess 81 formed in the second section D of the wheel unit. Section D of the wheel unit, which carried the driven gear 22 previously referred to, is formed with a slot 83 tangential to the periphery of the hub 80 in which is positioned a worm 84 for engaging teeth 82 formed on the hub 80. The worm 84 is positioned in the slot 83 by engagement of shoulder 85 in the slot with an annular groove 86 in the worm. A spring 87 is provided in the recess 88 to exert a longitudinal force upon the worm 84 to effectively overcome any tendency of the worm to turn because of vibration or the like. The end of the worm is formed with a slot 89 for receiving a suitable tool (not shown), such as a screw driver, by means of which the worm can be manually turned. Turning of the worm 84, by reason of its engagement with the toothed hub 80 of section C of the wheel, provides an infinite adjustment between the sections C and D of the wheel unit whereby the notch 78 in the first section C may be positioned at any desired rotated point with respect to the driving mechanism carried by section D of the counterwheel unit. If desired, suitable indicia (not shown) may be provided on the peripheries of the sections C and D adjacent the inner edges to facilitate the relative positioning of the sections by the operator.

Inasmuch as the visible predetermining counterwheel units are completely actuated during the first half turn of the registering counterwheel unit of lowest order 18 as previously described, it will be appreciated that the relative settings of the sections C and D of the counterwheel unit 23 at least during the last half of a turn thereof will have no effect whatsoever on the driving and positioning of the visible predetermining counterwheel units. This is a material advantage giving a high degree of flexibility to the adjustment of the counterwheel unit 23.

The device constructed in accordance with the invention, as described above, will be seen to have many novel and useful advantages resulting in superior performance of the device and greatly increasing its usefulness. The simplicity and ease of manufacturing of the parts has been improved while, at the same time, the device is less susceptible to breakage or malfunctioning through improper usage of the device either inadvertently or purposely.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

The counterwheel unit 23 described above and shown in Figs. 5 and 6 of the drawings is disclosed and claimed in the copending application of James B. Hoye, Serial No. 67,451, filed December 27, 1948.

I claim as my invention:

1. In a register mechanism, the combination comprising a longitudinally shiftable reset shaft, a counterwheel unit rotatably mounted on the shaft, means operative when the reset shaft is shifted longitudinally for forming a driving connection between the reset shaft and counterwheel unit, a driven member rotatably mounted on the shaft, friction means interconnecting the counterwheel unit and the driven member, a pair of springs for applying pressure to said friction means, and means actuated by the reset shaft for relieving the pressure of one of said springs when the reset shaft is shifted to carry out a resetting operation.

2. In a register mechanism, the combination comprising a longitudinally shiftable reset shaft, a counterwheel unit rotatably mounted on the shaft, means operative when the reset shaft is shifted longitudinally for forming a driving connection between the reset shaft and counterwheel unit, a driven member rotatably mounted on the shaft, friction means interconnecting the counterwheel unit and the driven member, comprising a pair of elements axially slidable but non-rotatably fixed to the conuterwheel and disposed on opposite sides of the driven means, a pair of springs urging said elements toward the driven member, and means actuated by the reset shaft for displacing one of the elements away from the driven member when the reset shaft is shifted longitudinally.

3. In a register mechanism, the combination comprising a longitudinally shiftable reset shaft, a counterwheel unit rotatably mounted on the shaft, means operative when the reset shaft is shifted longitudinally for forming a driving connection between the reset shaft and counterwheel unit, a driven gear rotatably mounted on the shaft, means normally interengaging the counterwheel unit and the drive gear but releasable by longitudinally shifting of the reset shaft, and braking means operable between the driven gear and the counterwheel unit for retarding rotation of the counterwheel unit relative to the driven gear when said interengaging means is released.

4. In a register mechanism, the combination comprising a longitudinally shiftable reset shaft, a counterwheel unit rotatably mounted on the shaft, means operative when the reset shaft is shifted longitudinally for forming a driving connection between the reset shaft and counterwheel unit, a driven gear rotatably mounted on the shaft, a pressure plate slidably secured to the counterwheel unit and adapted to form a frictional engagement with the driven gear, a spring for urging said pressure plate into frictional engagement with said driven gear with sufficient force to cause said wheel unit to be driven by said gear, means on the reset shaft for moving said friction plate out of frictional engagement with said gear when the reset shaft is shifted longitudinally, a second friction plate slidably secured to the counterwheel unit and adapted to frictionally engage said driven gear, and a spring for urging said pressure plate into yielding frictional engagement with said gear.

5. In a register mechanism, the combination comprising a longitudinally shiftable reset shaft having a longitudinal reset groove therein, a counterwheel unit having a hub rotatably mounted on said shaft, a reset pawl mounted in said hub and adapted to engage the reset groove when the reset shaft is shifted longitudinally and turned to align the reset groove therewith, a driven gear rotatably mounted on the hub, a pressure plate slidably keyed to the hub, a spring for urging the pressure plate into frictional engagement with one side of the driven gear, a shoulder on the reset shaft for sliding the pressure plate out of engagement with said driven gear when the reset shaft is shifted longitudinally, a second pressure plate slidably keyed to the hub, and a spring for urging the second pressure plate into frictional engagement with the other side of the driven gear, the force of said last named spring being sufficient to prevent turning of the counterwheel unit with the reset shaft prior to engagement of the reset pawl in the reset groove but insufficient to prevent resetting.

6. In a register mechanism, the combination comprising a longitudinally shiftable reset shaft; a counterwheel assembly comprising a hub rotatably mounted on the shaft, a number wheel fixed to the hub for rotation therewith, a driven gear mounted on the hub and freely rotatable thereon, a member slidably but non-rotatably mounted on the hub and engageable with the driven gear, and means biasing the member into frictional engagement with the driven gear; and means forming a connection between the member and reset shaft whereby the member may be shifted to reduce the friction between the member and the driven gear when the reset shaft is shifted.

7. In a register mechanism, the combination comprising a longitudinally shiftable reset shaft having a radial shoulder and a counterwheel assembly comprising a hub rotatably mounted on the shaft, a number wheel fixed to the hub for rotation therewith, a driven gear mounted on the hub and freely rotatable thereon, a friction member non-rotatably mounted on the hub but slidable into and out of frictional engagement with the driven gear, means biasing the member into engagement with the driven gear, and a projection on the friction member extending into the hub for engagement with the shoulder of the reset shaft, whereby the friction member may be shifted by the reset shaft.

8. In a register mechanism, the combination comprising a longitudinally shiftable reset shaft having a radial shoulder, and a counterwheel assembly comprising a hub rotatably mounted on the shaft having an enlarged portion slidably receiving said shoulder, a driven gear freely rotatable on the hub, a cup-shaped number wheel fixed to the hub with its open side facing the driven gear, a friction member non-rotatably but slidably mounted on the hub within the cup-shaped number wheel, means biasing the friction member toward the gear, and an extension on the friction member extending into said enlarged portion of the hub for engagement by the shoulder of the reset shaft.

HARVEY N. BLISS.

REFERENCES CITED

The following references are of record in the file of this patent:

UNITED STATES PATENTS

| Number | Name | Date |
|--------|------|------|
| 306,629 | Maertens | Oct. 14, 1884 |
| 1,433,299 | Prouty | Oct. 24, 1922 |
| 1,671,553 | Sheldrick | May 29, 1928 |
| 1,980,232 | Slye | Nov. 13, 1934 |
| 2,177,437 | McLaren | Oct. 24, 1939 |
| 2,203,109 | Slye | June 4, 1940 |
| 2,342,325 | Bliss | Feb. 22, 1944 |
| 2,390,239 | De Lancey | Dec. 4, 1945 |